United States Patent [19]
Kobayashi

[11] Patent Number: 5,912,821
[45] Date of Patent: Jun. 15, 1999

[54] VIBRATION/NOISE CONTROL SYSTEM INCLUDING ADAPTIVE DIGITAL FILTERS FOR SIMULATING DYNAMIC CHARACTERISTICS OF A VIBRATION/NOISE SOURCE HAVING A ROTATING MEMBER

[75] Inventor: Toshiaki Kobayashi, Shiki, Japan

[73] Assignee: Honda Giken Kogyo Kabushiki Kaisha, Tokyo, Japan

[21] Appl. No.: 08/819,215

[22] Filed: Mar. 17, 1997

[30] Foreign Application Priority Data

Mar. 21, 1996 [JP] Japan .................................... 8-089931

[51] Int. Cl.$^6$ .................................................. G05B 17/02
[52] U.S. Cl. ............... 364/528.15; 364/578; 364/148.01; 381/71.11; 381/73.1; 381/94.1; 701/111
[58] Field of Search ........................... 364/528.15, 528.1, 364/148.01, 148.09, 148.1, 194, 724.012, 724.19, 824, 825, 578, 802, 816; 381/71.11, 71.12, 71.8, 71.4, 71.7, 73.1, 86, 94.1, 94.2, 94.8, 94.9; 701/111; 702/17, 33–35, 39, 42, 56, 79, 103, 105, 111, 113, 125, 189–191, 195, 197, 199; 73/35.09, 570, 571, 577, 579, 659, 660, 662, 496, 504.04, 504.12, 514.15, DIG. 1; 706/14, 22, 903, 904, 905, 907, 912, 913, 915

[56] References Cited

U.S. PATENT DOCUMENTS

| | | | |
|---|---|---|---|
| 5,295,192 | 3/1994 | Hamada et al. | 381/71.12 |
| 5,377,276 | 12/1994 | Terai et al. | 381/71.4 |
| 5,638,305 | 6/1997 | Kobayashi et al. | 364/528.15 |
| 5,701,349 | 12/1997 | Sano et al. | 381/86 |
| 5,761,383 | 6/1998 | Engel et al. | 706/14 |

FOREIGN PATENT DOCUMENTS

| | | |
|---|---|---|
| 6-274185 | 9/1994 | Japan . |
| 7-271451 | 10/1995 | Japan . |

*Primary Examiner*—Hal Dodge Wachsman
*Attorney, Agent, or Firm*—Frishauf, Holtz, Goodman, Langer & Chick

[57] ABSTRACT

A control system for controlling vibrations and noises generated by a vibration/noise source having at least a rotating member includes a first filter which generates a control signal for controlling the vibrations and noises. A self-expanding engine mount is arranged in a noise transmission path and converts the control signal into a driving signal for driving the noise source. An error sensor detects an error signal indicative of a difference between the driving signal and the vibrations and noises. A second filter stores a transfer characteristic of a portion of the noise transmission path extending between the first filter and the error sensor, and generates a reference signal based on the transfer characteristic. The control signal is updated in a manner such that the error signal is minimized. In addition, adaptive digital filters are provided for simulating both a dynamic characteristic of a physical system extending between the first filter and a predetermined control area and a dynamic characteristic of the portion of the transmission path extending between the first filter and the error sensor. The filter coefficients of the adaptive digital filters are updated in accordance with a genetic algorithm.

13 Claims, 6 Drawing Sheets

VIBRATION/NOISE CONTROL SYSTEM INCLUDING ADAPTIVE DIGITAL FILTERS FOR SIMULATING DYNAMIC CHARACTERISTICS OF A VIBRATION/NOISE SOURCE HAVING A ROTATING MEMBER

BACKGROUND OF THE INVENTION

1. Field of the Invention

This invention relates to a vibration/noise control system, and more particularly to a vibration/noise control system which actively controls vibrations and noises generated with a periodicity or a quasi-periodicity from a rotating member and the like, to thereby reduce the vibrations and noises.

2. Prior Art

Recently, vibration/active noise control systems have been intensively developed in various fields of industry. These systems are adapted to damp vibrations and noises produced from vibration/noise sources using an adaptive digital filter (hereinafter referred to as "ADF"), to thereby reduce the vibrations and noises.

These conventional vibration/active noise control systems include a vibration/noise control system proposed in Japanese Laid-Open Patent Publication (Kokai) No. 7-271451 by the present assignee, wherein a sine wave signal having a single repetition period is generated depending on the repetition period of vibrations and noises peculiar to component parts of the vibration/noise source, and the sine wave signal and a delayed sine wave signal which is delayed in phase by a predetermined period relative to the former are input to the ADF.

In the proposed vibration/noise control system, a Wiener filter (hereinafter referred to as "the W filter") of a Finite Impulse Response (FIR) type having two taps (filtering order number) is employed as the ADF (first filter means), and a rotation signal from a rotating member is detected in the form of a pulse signal whenever the rotating member rotates through a predetermined very small rotating angle (e.g. 3.6°). More specifically, in the proposed vibration/noise control system, a sine wave signal for one repetition period is generated whenever the rotating member rotates one rotation (360 degrees), and the thus generated sine wave signal and a delayed sine wave signal obtained by delaying the sine wave signal in phase by a predetermined period are input to the first filter means for executing adaptive control, whereby even with the use of the ADF having two taps, the adaptive control can be achieved, enabling a reduction in the time period required for the product-sum operation (convolution) to be carried out.

According to the proposed active noise control system, an identifying sound is generated, which is lower in level by a predetermined amount than the background noise, so that the transfer characteristic of the noise transmission path can be identified while the active control of vibrations and noises is carried out, without the identifying sound being sensed by the passenger(s).

That is, since vehicles, such as automotive vehicles in which vibrations and noises are generated with a periodicity or a quasi-periodicity, are used to travel under various environments over a long time period, the transfer characteristic of the vibration/noise transmission path changes depending on environments under which the vehicle travels. In particular, when vibration/noise control is carried out for a vehicle in which the engine is mounted on a so-called self-expanding engine mount, there can occur a change in the elasticity of rubber members constituting part of the engine mount due to temperature changes, and/or hardening of the rubber members due to aging, which causes a change in the transfer characteristic. Further, the transfer characteristic of vibrations and noises within the vehicle compartment delicately changes depending on various factors, such as the temperature, the humidity, open/closed states of windows of the vehicle, and seating locations of passengers and the number of the passengers. The proposed active noise control system copes with the above-mentioned circumstances by generating an identifying sound which is lower in level by a predetermined amount than the background noise to identify the transfer characteristic of the noise transmission path while the active control of vibrations and noises is carried out, to thereby achieve adaptive control in a manner compensating for a change in the transfer characteristic due to aging, etc. to some degree.

In the proposed active noise control system which generates the identifying sound at a lower level by a predetermined amount than the background noise, the identifying sound is required to have a good S/N ratio to obtain highly accurate identification results. However, if the identifying sound is set to a higher level to increase the S/N ratio, the identifying sound is sensed by the passenger(s), to thereby give an uncomfortable feeling to the passenger(s). That is, since the proposed active noise control system itself generates an identifying sound to identify the transfer characteristic of the vibration/noise transmission path while the active control of vibrations and noises is carried out, there may be an incompatibility between the reduction of the level of the identifying sound to such a level that it is not sensed by the passenger(s) and the achievement of a good S/N ratio. Thus, the proposed active noise control system can achieve only a limited accuracy of identification of the transfer characteristic of the vibration/noise transmission path in response to aging change and environmental change.

SUMMARY OF THE INVENTION

It is a first object of the invention to provide a vibration/noise control system which is capable of identifying the transfer characteristic of a vibration/noise transmission path in accordance with changes due to aging and traveling environment in an accurate manner without requiring an identifying sound to be generated as in the case of conventional vibration/noise control systems.

A second object of the invention is to provide a vibration/noise control system which is capable of achieving a high-speed identification of the transfer characteristic of a vibration/noise transmission path.

A third object of the invention is to provide a vibration/noise control system which is capable of always exhibiting high controllability of vibrations and noises in response to the actual conditions by initially storing results of identification carried out during checking of an automotive vehicle with the system installed thereon, and by then occasionally updating the identification results.

A fourth object of the invention is to provide a vibration/noise control system which employs good convergency especially for an FIR type ADF having two taps, thereby achieving high-speed processing.

To attain the first object, according to a first aspect of the invention, there is provided a vibration/noise control system for controlling vibrations and noises generated with a periodicity or a quasi-periodicity from a vibration/noise source having at least a rotating member, including timing pulse signal-detecting means for detecting at least one timing pulse signal indicative of a period of vibrations and noises peculiar to at least one component part of the vibration/noise source, first filter means formed by an adaptive digital filter and having a filter coefficient, for generating a control signal for controlling the vibrations and noises from the vibration/ noise source, electromechanical transducer means arranged in at least one of vibration/noise transmission paths through which the vibrations and noises from the vibration/noise source are transmitted, for converting the control signal into a driving signal for driving the vibration/noise source, error signal-detecting means for detecting an error signal indicative of a difference between the driving signal and a vibration/noise signal indicative of the vibrations and noises from the vibration/noise source, second filter means having a filter coefficient and storing a transfer characteristic of a portion of the at least one vibration/noise transmission path extending between the first filter means and the error signal-detecting means, and for generating a reference signal based on the transfer characteristic and the at least one timing pulse signal, control signal-updating means for updating the filter coefficient of the first filter means, thereby updating the control signal such that the error signal is made minimum, based on the error signal, the reference signal and the filter coefficient of the first filter means.

The vibration/noise control system according to the first aspect is characterized by comprising:

first dynamic characteristic-identifying means for identifying a dynamic characteristic of a physical system extending between the first filter means and a predetermined control area;

second dynamic characteristic-identifying means for identifying a dynamic characteristic of the portion of the at least one vibration/noise transmission path extending between the first filter means and the error signal-detecting means;

reference signal-updating means for updating the filter coefficient of said second filter means, based on results of identification by the second dynamic characteristic-identifying means;

wherein each of the first and second dynamic characteristic-identifying means includes an adaptive digital filter having a filter coefficient, and filter coefficient-updating means for updating the filter coefficient of the adaptive digital filter of the each of the first and second dynamic characteristic-identifying means.

With the above arrangement, the transfer characteristic of the vibration/noise transmission path can be identified in parallel with execution of the control of vibrations and noises without generation of an identifying sound as employed in the prior art, to thereby enable a reduction in the burden required for the identification operation. Further, the use of a different method from the method of generating an identifying sound, for identifying the transfer characteristic of the vibration/noise transmission path improves the robustness in respect of the S/N ratio, resulting in highly accurate identification results.

Preferably, the filter coefficient-updating means of the each of the first and second dynamic characteristic-identifying means updates the filter coefficient of the adaptive digital filter of the each of the first and second dynamic characteristic-identifying means, by the use of a genetic algorithm.

More preferably, the filter coefficient-updating means of the each of the first and second dynamic characteristic-identifying means calculates values of a performance function, based on a residual signal being a difference between the error signal and a quasi error signal from the first and second dynamic characteristic-identifying means, by the use of the genetic algorithm, and updates the filter coefficient of the adaptive digital filter of the each of the first and second dynamic characteristic-identifying means, according to an optimum one of the calculated values of the performance function.

Also preferably, the filter coefficient-updating means of the first dynamic characteristic-identifying means updates the filter coefficient of the adaptive digital filter of the first dynamic characteristic-identifying means, based on the optimum one of the calculated values of the performance function and the at least one timing pulse signal from the timing pulse signal-detecting means, and the filter coefficient-updating means of the second dynamic characteristic-identifying means updates the filter coefficient of the adaptive digital filter of the second dynamic characteristic-identifying means, based on the optimum one of the calculated values of the performance function and the control signal from the first filter means.

Preferably, the filter coefficient-updating means of the each of the first and second dynamic characteristic-identifying means calculates the performance function such that the residual signal assumes a minimum value.

To attain the first, second and fourth objects, according to a second aspect of the invention, there is provided a vibration/noise control system for controlling vibrations and noises generated with a periodicity or a quasi-periodicity from a vibration/noise source having at least a rotating member, including timing pulse signal-detecting means for detecting at least one timing pulse signal indicative of a period of vibrations and noises peculiar to at least one component part of the vibration/noise source, sine wave-generating means for generating a reference sine wave having a single repetition period dependent upon time intervals of generation of the at least one timing pulse signal, delayed sine wave-generating means for generating a delayed sine wave which is delayed by a delay period T of $\frac{1}{3} \geq T \geq \frac{1}{7}$ relative to the reference sine wave, wherein T is a real number, first filter means formed by an adaptive digital filter having two taps and a filter coefficient, for generating a control signal for controlling the vibrations and noises from the vibration/noise source, electromechanical transducer means arranged in at least one of vibration/noise transmission paths through which the vibrations and noises from the vibration/noise source are transmitted, for converting the control signal into a driving signal for driving the vibration/noise source, error signal-detecting means for detecting an error signal indicative of a difference between the driving signal and a vibration/noise signal indicative of the vibrations and noises from the vibration/noise source, second filter means having a filter coefficient and storing a transfer characteristic of a portion of the at least one vibration/noise transmission path extending between the first filter means and the error signal-detecting means, and for generating a reference signal based on the transfer characteristic and the at least one timing pulse signal, control signal-updating means for updating the filter coefficient of the first filter means, thereby updating the control signal such that the error signal is made minimum, based on the error signal, the reference signal and the filter coefficient of the first filter means.

The vibration/noise control system according to the second aspect is characterized by comprising:

first dynamic characteristic-identifying means for identifying a dynamic characteristic of a physical system extending between the first filter means and a predetermined control area;

second dynamic characteristic-identifying means for identifying a dynamic characteristic of the portion of the at least one vibration/noise transmission path extending between the first filter means and the error signal-detecting means;

reference signal-updating means for updating the filter coefficient of sad second filter means, based on results of identification by the second dynamic characteristic-identifying means;

wherein each of the first and second dynamic characteristic-identifying means includes an adaptive digital filter having a filter coefficient, and filter coefficient-updating means for updating the filter coefficient of the adaptive digital filter of the each of the first and second dynamic characteristic-identifying means, the adaptive digital filter of the each of the first and second dynamic characteristic means having two taps.

With the above arrangement, the first and second dynamic characteristic-identifying means have adaptive digital filters each having two taps. As a result, in addition to the results obtained by the first aspect of the invention, the identification operation can be carried out at a high speed, to thereby improve the convergency of the control.

Preferably, the delay period T is set to ¼ of a repetition period of the reference sine wave.

With the above arrangement, the control signal is generated based on the reference sine wave having a single repetition period and a delayed sine wave which is delayed in phase by ¼ of the repetition period relative to the reference sine wave. As a result, adaptive control can be achieved with high convergency both in the vibration/noise control and the identifying processing.

If the filter coefficient-updating means of the each of the first and second dynamic characteristic-identifying means updates the filter coefficient of the adaptive digital filter of the each of the first and second dynamic characteristic-identifying means, by the use of a genetic algorithm, it is advantageous that the first filter means generates a first control signal corresponding to the reference sine wave, and a second control signal corresponding to the delayed sine wave, the filter coefficient-updating means of the first dynamic characteristic-identifying means updating the filter coefficient of the adaptive digital filter of the first dynamic characteristic-identifying means, based on the optimum one of the calculated values of the performance function and the reference sine wave or the delayed sine wave, and the filter coefficient-updating means of the second dynamic characteristic-identifying means updates the filter coefficient of the adaptive digital filter of the second dynamic characteristic-identifying means, based on the optimum one of the calculated values of the performance function and the first and second control signals.

To attain the third object, the vibration/noise control system according to the first and second aspects of the invention includes rotational speed-detecting means for detecting rotational speed of the rotating member, based on results of the detection by the timing pulse signal-detecting means, first dynamic characteristic-storing means storing the dynamic characteristic of the physical system extending between the first filter means and the predetermined control area as a function of the rotational speed of the rotating member, second dynamic characteristic-storing means storing the dynamic characteristic of the portion of the at least one vibration/noise transmission path extending between the first filter means and the error signal-detecting means as a function of the rotational speed of the rotating member, and dynamic characteristic-updating means for updating the dynamic characteristics stored in the first and second dynamic characteristic-storing means, based on results of the identifying by said first and second dynamic characteristic-identifying means.

With the above arrangement, values of dynamic characteristics are stored beforehand, and occasionally updated. In the case where there is no updated value of the transfer characteristic corresponding to the rotational speed of the rotating object or in the event of malfunctioning of the engine, values of the dynamic characteristics previously stored in the first and second dynamic characteristic-storing means can be used in the control to thereby always secure required controllability in response to the actual conditions.

The above and other objects, features, and advantages of the invention will become more apparent from the following detailed description taken in conjunction with the accompanying drawings.

DETAILED DESCRIPTION

The invention will now be described in detail with reference to the drawings showing embodiments thereof, in which the system is applied to an automotive vehicle.

Figure 1:
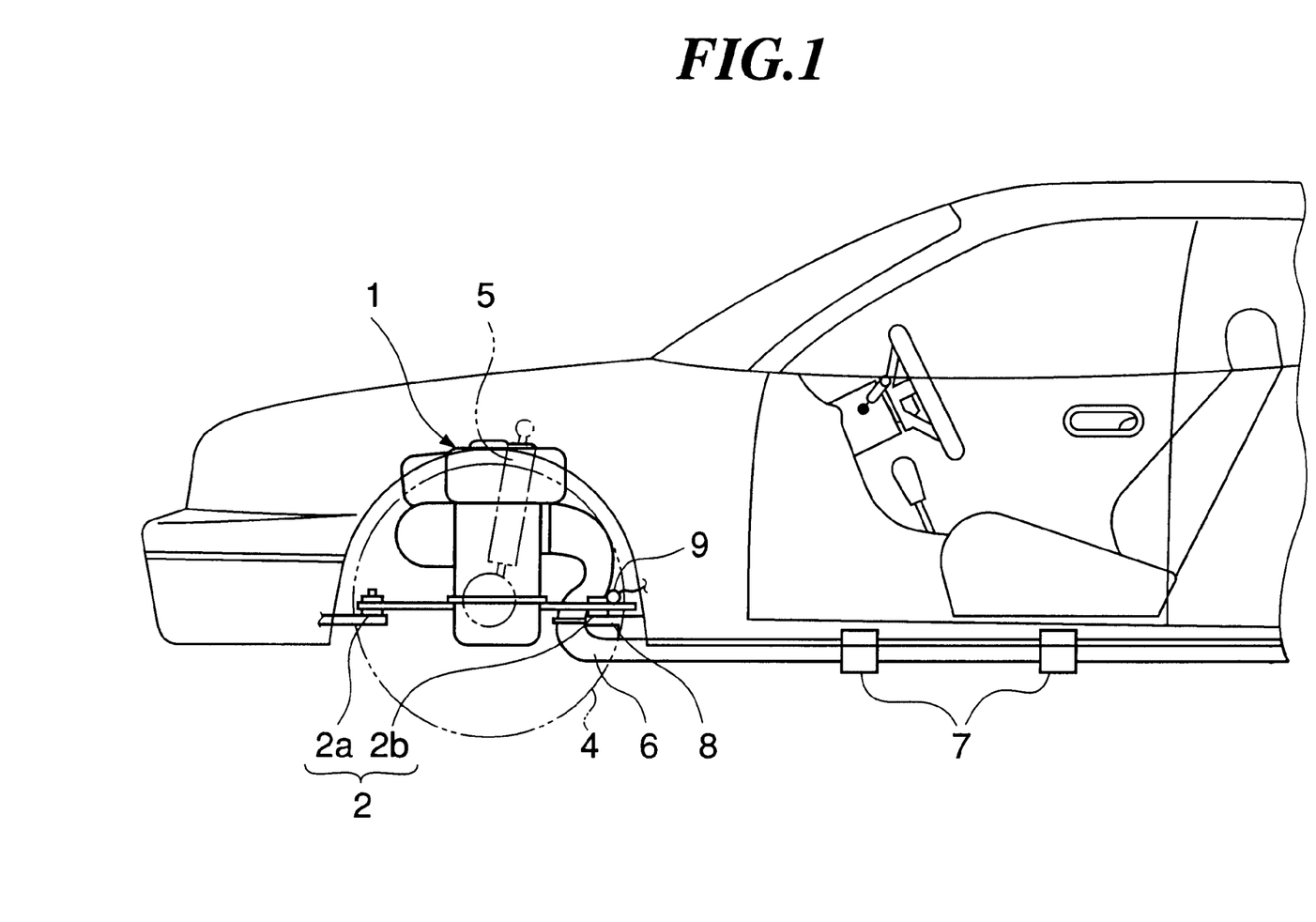
FIG. 1 is a schematic diagram showing how an engine is mounted on the chassis of an automotive vehicle.

FIG. 1 schematically shows how an engine is mounted on the chassis of an automotive vehicle, wherein the engine forms a source of vibrations and noises generated with a periodicity or a quasi-periodicity.

In the figure, reference numeral 1 designates an internal combustion engine of a four-cycle straight four-cylinder type (hereinafter simply referred to as "the engine") as a power plant for driving an automotive vehicle. The engine 1 is supported on a chassis 8 by an engine mount 2, a suspension device 5 for front wheels (driving wheels) 4, and a supporting means 7 for an exhaust pipe 6.

The engine mount 2 is comprised of a suitable number of self-expanding engine mounts 2a as electromechanical transducer means which are capable of changing a vibration/noise transfer characteristic thereof, and a suitable number of normal or known engine mounts 2b which are incapable of changing a vibration/noise transfer characteristic thereof.

The self-expanding engine mounts 2a have respective actuators incorporated therein, which are formed of voice coil motors (VCM), piezo-electric elements, magnetostrictive elements, or the like, and operate to control vibrations of the engine according to a signal from an electronic mount control unit (hereinafter referred to as "the EMCU"), not shown, in a manner responsive to vibrations of the engine. More specifically, the self-expanding engine mounts 2a are each formed therein with a liquid chamber, not shown, which is filled with liquid, and operate to prevent vibrations from being transmitted from the engine 1 to the chassis 8, via elastic rubber members, not shown, fixed to the engine 1 (vibration/noise source) by means of the actuators.

A vibration/noise error sensor 9 is arranged in the vicinity of the engine mounts 2b. A rotation sensor, not shown, which is formed of a magnetic sensor or the like, is arranged in the vicinity of a flywheel, not shown, fixed to a crankshaft, not shown, of the engine 1, for detecting rotation of the flywheel.

Figure 2:
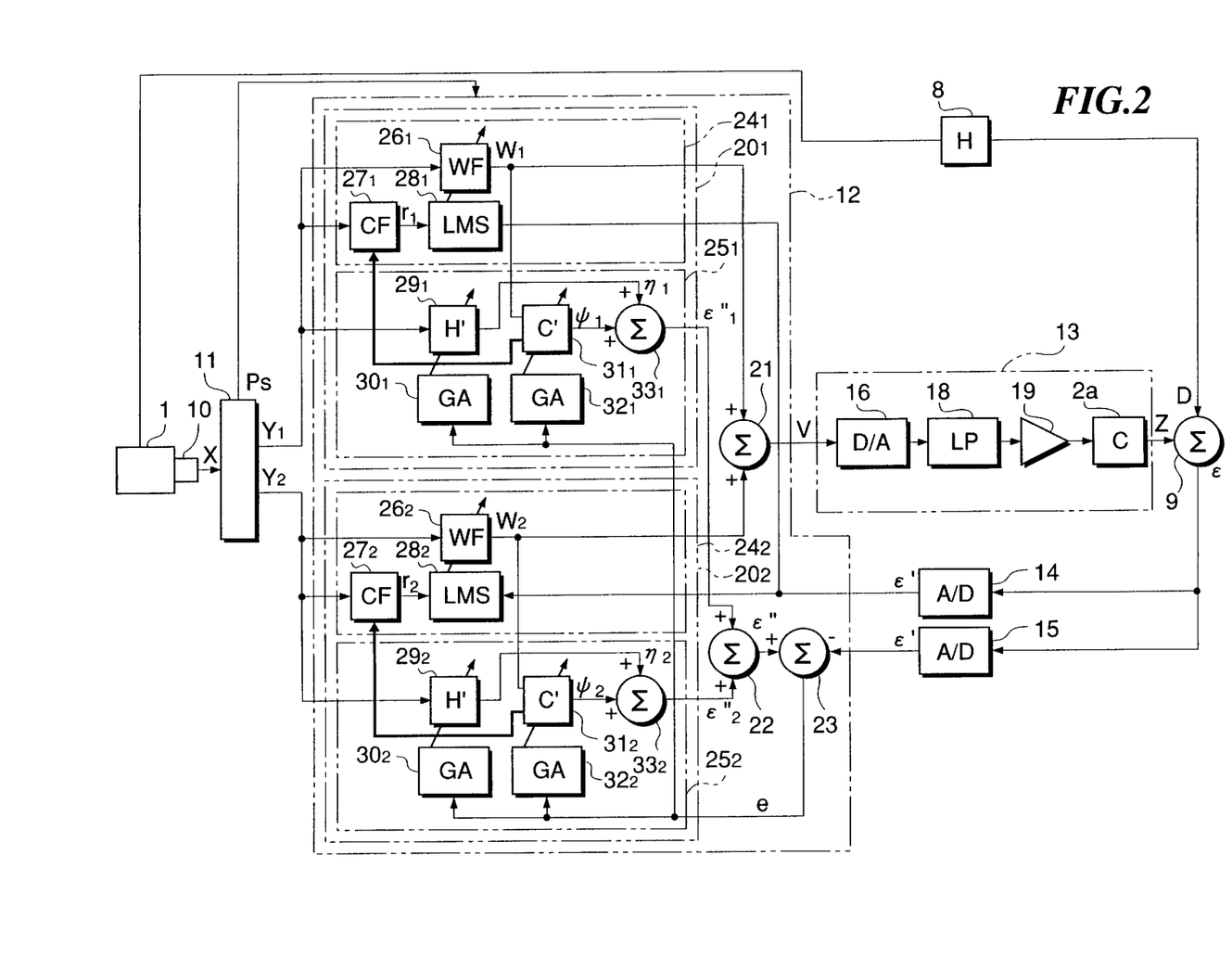
FIG. 2 is a block diagram schematically showing the whole arrangement of a vibration/noise control system according to a first embodiment of the invention.

FIG. 2 schematically shows the whole arrangement of a vibration/noise control system according to a first embodiment of the invention.

The vibration/noise control system is comprised of the rotation sensor 10, an electronic control unit (hereinafter referred to as "the ECU") 11 for generating sampling pulses Ps defining a sampling frequency, based on a basic pulse signal X from the rotation sensor 10 and also generating two different timing pulse signals $Y_1$ and $Y_2$ corresponding to predetermined vibration orders by dividing the sampling frequency, a digital signal processor (hereinafter referred to as "the DSP") 12 which is capable of making high-speed operation to perform adaptive control upon outputting of the timing pulse signals $Y_1$ and $Y_2$ from the ECU 11 as trigger signals, a vibration/noise transmission path 13 through which passes a control signal V (digital signal) which is output from the DSP 12, the vibration/noise error sensor 9 which is supplied with the control signal V having passed through the vibration/noise transmission path 13, as a driving signal Z, as well as with a vibration noise signal D transmitted from the engine 1 through the chassis 8, and A/D converters 14 and 15 for converting an error signal $\epsilon$ (analog signal) from the vibration/noise error sensor 9 into a digital error signal $\epsilon'$ and supplying the same to the DSP 12 in a feedback manner.

The rotation sensor 10 counts teeth of a ring gear provided along the periphery of the flywheel to generate the basic pulse signal X in the form of pulses, and delivers the basic pulse signal X to the ECU 11. The ECU 11 generates the sampling pulse signal Ps defining the sampling frequency, based on the basic pulse signal X and delivers the signal Ps to the DSP 12 to thereby drive the system, and further divides the frequency of the sampling pulse signal Ps, based on a vibration/noise transfer characteristic peculiar to engine component parts, such as the piston system and the combustion chamber of the engine 1 (vibration source), to thereby generate two types of timing pulse signals $Y_1$ and $Y_2$.

More specifically, the ECU 11 generates the timing pulse signal $Y_1$ which is suitable for controlling a vibration component (primary vibration component) caused by the piston system and having a regular vibration/noise characteristic in synchronism with rotation of the engine 1, and the timing pulse signal $Y_2$ which is suitable for controlling a vibration component (secondary vibration component) caused by explosion pressure (exciting force) and having an irregular vibration/noise characteristic depending on a combustion state of the engine. In other words, the piston system carries out one reciprocating motion per rotation of the crankshaft, and it is therefore considered that vibration of the piston system occurs once per rotation of the crankshaft. Accordingly, the timing pulse signal $Y_1$ for controlling the primary vibration component is generated once per rotation of the crankshaft of the engine 1. On the other hand, one explosion stroke takes place per two rotations of the crankshaft, and therefore vibration caused by the explosion stroke occurs once per two rotations of the crankshaft. In the four-cylinder engine, four explosion strokes take place per two rotations of the crankshaft, and therefore the timing pulse signal $Y_2$ for controlling the secondary vibration component is generated once per half a rotation of the crankshaft of the engine 1. These timing pulse signals $Y_1$ and $Y_2$ are supplied to the DSP 12.

Thus, the invention employs the concept of the vibration order and carries out the adaptive control on each of a plurality of vibration orders of the vibration components, which makes it possible to reduce vibrations and noises more effectively. In the present embodiment, the adaptive control is separately carried out on the primary vibration component having a regular vibration noise characteristic and on the secondary vibration component, which is related to the explosion pressure and has an irregular vibration/noise characteristic, to thereby effectively reduce the vibrations and noises.

The means for detecting the rotation of the engine 1 is not limited to a sensor of the above-mentioned type which counts the teeth of the ring gear of the flywheel, but an encoder or the like may be used for directly detecting the rotation of the crankshaft or the camshaft and generating a signal indicative of the sensed rotation. However, when the rotation of the crankshaft is directly detected, the detection is susceptible to variations in the rotation which are caused by torsional vibrations of the crankshaft, etc. Also when the rotation of the camshaft is directly detected, the detection is susceptible to variations in the rotation of the camshaft, though they are slight in magnitude, e.g. due to elongation of a timing belt connecting between a pulley mounted on the camshaft and a pulley mounted on the crankshaft. In contrast, the flywheel, which is rigidly fixed to the crankshaft, has a large moment of inertia and hence little suffers from variations in its rotation. Therefore, detection of the rotation signal X obtained by counting the teeth of the ring gear as employed in the present embodiment is advantageous in that it can provide a desired sampling frequency in an easier and more accurate manner.

The vibration/noise transmission path has arranged threalong a D/A converter 16 for converting the control signal V from the DSP 12 into an analog signal, a fixed low-pass filter (LPF) 18 (cut-off frequency Fc=Fs/2) for smoothing an output signal (rectangular signal) from the D/A converter 16, an amplifier 19 for amplifying an output signal from the LPF 18, and the aforementioned self-expanding engine mount 2a.

The DSP 12 is comprised of two adaptive control circuits $20_1$ and $20_2$ for carrying out adaptive control in synchronism with the generation period of the timing pulse signals $Y_1$ and $Y_2$, an adder 21 for adding together control signals $W_1$ and $W_2$ output, respectively, from the adaptive control circuits $20_1$ and $20_2$, an adder 22 for adding together quasi error signals $\epsilon''_1$ and $\epsilon''_2$ output, respectively, from the adaptive control circuits $20_1$ and $20_2$ to generate a quasi error signal $\epsilon''$, and an adder 23 for adding together the quasi error signal $\epsilon''$ from the adder 22 and a digital error signal $\epsilon'$ output from the A/D converter 15 to generate a residual signal e.

The adaptive control circuits $20_1$ and $20_2$ are each comprised of a vibration/noise control block $24_1$ and $24_2$, and an identifying processing block $25_1$ and $25_2$.

More specifically, the vibration/noise control blocks $24_1$ and $24_2$ are each comprised of a W filter (first filter means) $26_1$, $26_2$ for executing predetermined adaptive control upon inputting of the timing pulse signal $Y_1$, $Y_2$ as a trigger signal to generate a control signal $W_1$, $W_2$, a C filter (second filter means) $27_1$, $27_2$ which previously stores a transfer characteristic of the vibration/noise transmission path 13 which has been identified, the identified transfer characteristic being updated according to the rotational speed of the engine 1 in response to aging change, etc., and an LMS (Least Mean Square) processing block $28_1$, $28_2$ for updating the filter coefficient of the W filter $26_1$, $26_2$, based on a reference signal $\gamma_1$, $\gamma_2$ output from the C filter $27_1$, $27_2$, the digital error signal $\epsilon'$ from the A/D converter 14, and the present filter coefficient value of the W filter $26_1$, $26_2$.

The identifying processing blocks $25_1$, $25_2$ are each comprised of an H system-identifying filter (first dynamic characteristic-identifying means and first dynamic characteristic-storing means) $29_1$, $29_2$ which previously stores a dynamic characteristic of a physical system extending from the engine 1 to the vibration/noise error sensor 9 (predetermined control area) as a dynamic transfer characteristic, and occasionally updates the stored dynamic characteristic to generate a quasi control signal $\eta_1$, $\eta_2$ indicative of the updated dynamic characteristic, a first genetic algorithm (GA) processing block $30_1$, $30_2$ which updates the filter coefficient of the H system-identifying filter $29_1$, $29_2$, based on the residual signal e from the adder 23, a C system-identifying filter (second dynamic characteristic-identifying means and second dynamic characteristic-storing means) $31_1$, $31_2$ which is supplied with the control signal $W_1$, $W_2$ and previously stores a dynamic characteristic of the vibration/noise transmission path 13 (hereinafter referred to as "C system dynamic characteristic") as a dynamic transfer characteristic and occasionally updates the stored dynamic characteristic to generate a quasi reference signal $\psi_1$, $\psi_2$ indicative of the updated dynamic characteristic), a second GA processing block $32_1$, $32_2$ which updates the filter coefficient of the C system-identifying filter $31_1$, $31_2$, based on the residual signal e from the adder 23, and an adder $33_1$, $33_2$ which adds together the quasi control signal $\eta_1$, $\eta_2$ and the quasi reference signal $\psi_1$, $\psi_2$ to generate the quasi error signal $\epsilon''_1$, $\epsilon''_2$. The H system-identifying filter $29_1$, $29_2$ and the C system-identifying filter $31_1$, $31_2$ store the H system dynamic characteristic and the C system dynamic characteristic, respectively, as a function of a frequency corresponding to the rotational speed of the engine 1. Results of an identification carried out by an identifying method, hereinafter described, are delivered from the C system-identifying filter $31_1$, $31_2$ to the C filter $27_1$, $27_2$ of the vibration/noise control block $24_1$, $24_2$, where they are copied and the filter coefficient of the C filter $27_1$, $27_2$ is updated thereby.

Now, the operation of the vibration/noise control system according to the present invention will be described.

In the present vibration/noise control system, the vibration/noise control by the vibration/noise control block $24_1$, $24_2$ is preferentially executed. On the other hand, the identifying processing is executed during a time period when no arithmetic operation is substantially carried out by the LMS processing block $28_1$, $28_2$ after the updated value of the filter coefficient of the W filter $26_1$, $26_2$ is converged.

Figure 3:
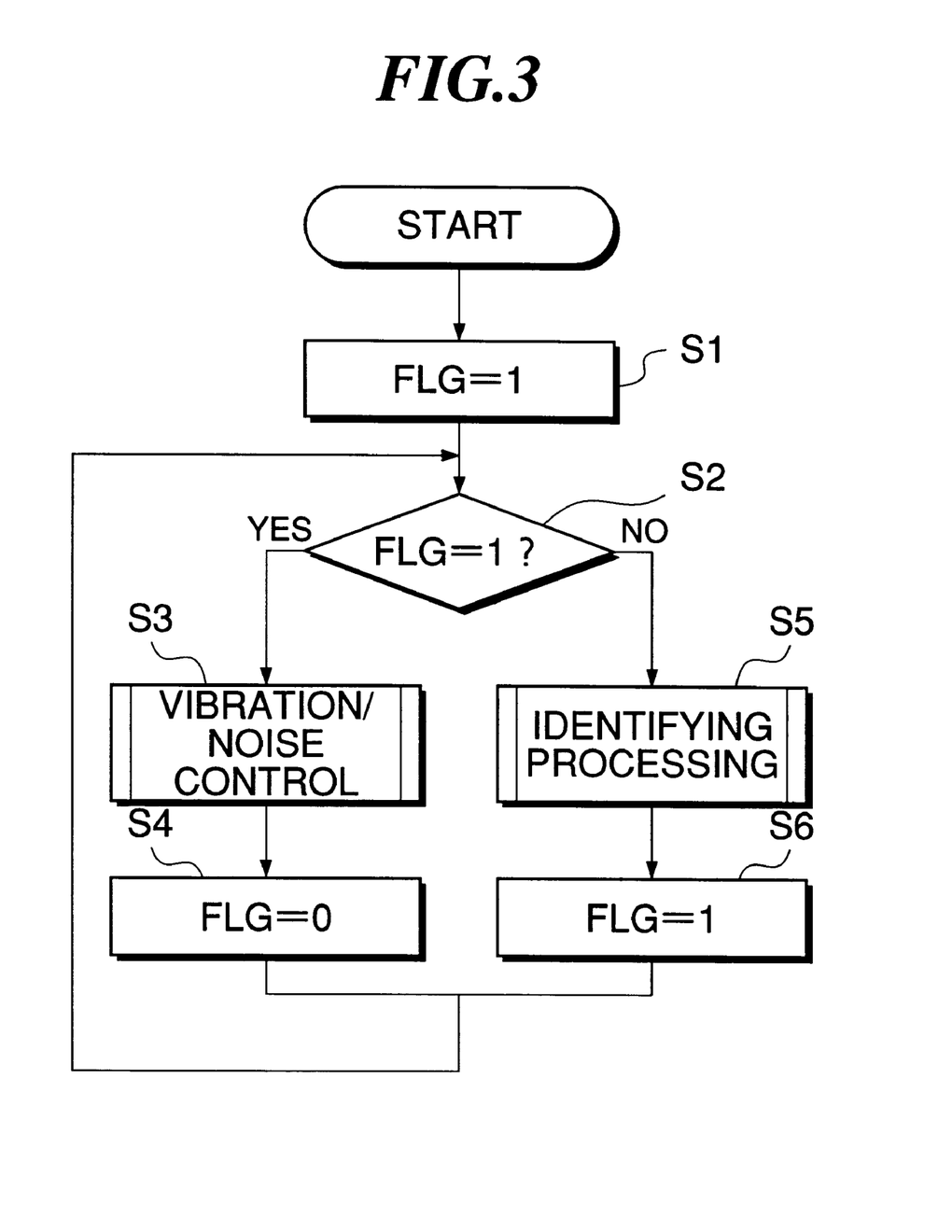
FIG. 3 is a flowchart showing a program for selectively executing vibration/noise control and identifying control according to the first embodiment.

FIG. 3 shows a program for selectively executing the vibration/noise control and the identifying processing. This program is executed in synchronism with generation of the timing pulse signal $Y_1$, $Y_2$.

First, when the timing pulse signal $Y_1$, $Y_2$ is input to the adaptive control circuit $20_1$, $20_2$, a flag FLG is set to "1" at a step S1. At the following step S2, it is determined whether or not the flag FLG has been set to "1". In the first execution of this step, the flag has just been set to "1", and therefore the answer to the question of the step S2 is affirmative (YES), so that the program proceeds to a step S3, wherein the vibration/noise control is executed. When the filter coefficient of the W filter $26_1$, $26_2$ has been converged and a substantial arithmetic operation has been completed by the LMS processing block $28_1$, $28_2$, the program proceeds to a step S4, wherein the flag FLG is set to "0", followed by the program returning to the step S2. Then, the answer to the question of the step S2 becomes negative (NO), and therefore the program proceeds to a step S5, wherein the identifying processing is executed. Thereafter, when the updated coefficient values of the H system-identifying filter $29_1$, $29_2$ and the C system-identifying filter $31_1$, $31_2$ have been converged so that the first and second GA processing blocks $30_1$, $30_2$, $32_1$, $32_2$ have completed their substantial arithmetic operations, the program proceeds to a step S6 to set the flag FLG to "1", followed by the program again returning to the step S2 to thereby repeatedly execute the above processing. In this manner, the vibration/noise control and the identifying processing are alternately executed, utilizing the time intervals of generation of the timing pulse signal $Y_1$, $Y_2$. Since substantial arithmetic operations of the vibration/noise control and the identifying processing are thus not concurrently executed but executed alternately with each other, it can be avoided that the two kinds of arithmetic operations interfere with each other, resulting in divergence of the operation results.

As mentioned above, in the present vibration/noise control system, the vibration/noise control block $24_1$, $24_2$ is allowed to perform its control with priority to the identifying processing block $25_1$, $25_2$. Therefore, even when the identifying processing block $25_1$, $25_2$ is operating, if the flag FLG is set to "1" upon generation of the timing pulse signal $Y_1$, $Y_2$ to actuate the vibration/noise control block $24_1$, $24_2$, the identifying processing block $25_1$, $25_2$ is stopped.

Next, the operation of the vibration/noise control block $24_1$, $24_2$ will be described with reference to the arrangement of FIG. 2.

When the timing pulse signal $Y_1$, $Y_2$ from the ECU 11 is input to the vibration/noise control block $24_1$, $24_2$, the control signal W1, W2 is output from the W filter $26_1$, $26_2$. The control signals $W_1$ and $W_2$ are added together at the adder 21, the resulting sum is output as the control signal V. The control signal V is delivered through the vibration/noise transmission path 13 whereby it is converted into the driving signal Z, which is input to the vibration/noise error sensor 9.

On the other hand, the vibration/noise signal D from the engine 1 is transmitted through the chassis 8 to be input to the vibration/noise error sensor 9, which in turn generates the analog error signal $\epsilon$. This error signal $\epsilon$ is then converted into the digital error signal $\epsilon'$ which is input to the LMS processing block $28_1$, $28_2$, wherein the filter coefficient of the w filter $26_1$, $26_2$ is updated based on the digital error signal $\epsilon'$, the reference signal $\gamma_1$, $\gamma_2$ output from the C filter $27_1$, $27_2$, and the present filter coefficient value of the W filter $26_1$, $26_2$, and the resulting new control signal $W_1$, $W_2$ is output from the W filter $26_1$, $26_2$. The above processing is repeated executed to thereby perform the adaptive control so that the digital error signal $\epsilon'$ assumes the minimum value.

Next, the identifying processing executed by the identifying processing block $25_1$, $25_2$ will be described.

Figure 4:
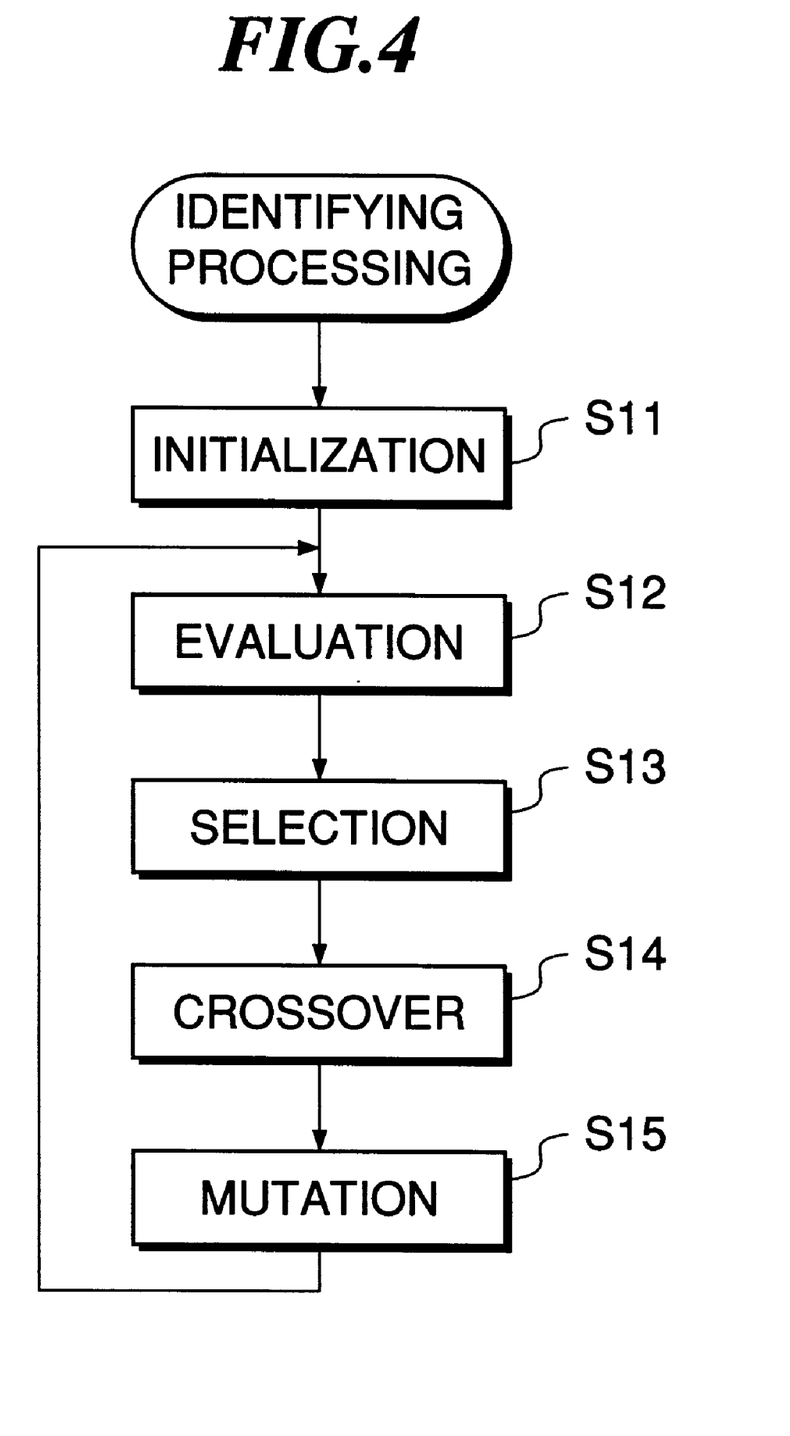
FIG. 4 is a flowchart showing a program for executing the identifying control.

FIG. 4 shows a manner of carrying out the identifying processing employed in the present embodiment. The identifying processing block $25_1$, $25_2$ employs Genetic Algorithm (GA) for the identifying operation, which is implemented by the first and second GA processing blocks $30_1$, $30_2$, $32_1$, $32_2$. GA is an algorithm based on evolution of alternation of generations of an organism, which simulates several steps of evolution of an organism At a step S11, the number of individuals of a first generation on an error curved surface is determined to initialize the algorithm. More specifically, a number of individuals corresponding to the number of taps contained in the H system-identifying filter $29_1$, $29_2$ or the C system-identifying filter $31_1$, $31_2$ are adopted as a set of individuals (genes) and placed on the error curved surface. From these individuals, a suitable number of individuals are optionally selected. Using the selected individuals as a first generation, the algorithm is initialized.

Then, at a step S12, a difference between each individual and the digital error signal $\epsilon'$ from the vibration/noise error sensor 9 is calculated to thereby obtain a provisional residual error signal e. By substituting the error signal e into the following equation (1), a performance function F for the first generation is calculated:

$$F = K/E(e^2) \tag{1}$$

where $E(e^2)$ represents a mean square error of the residual signal e, and K a constant.

As is seen from the above equation, when the error signal e assumes the minimum value, the performance function F becomes the maximum.

Then, at a step S13, selection of the performance function F is carried out. That is, from a suitable number of values of the performance function F obtained by the above equation (1), several numbers of values of the performance function F which are evaluated at higher ranks are selected, while the remaining number of values of performance function F are destroyed.

Then, at a step S4, a crossover is carried out to determine individuals (genes) of the next generation. More specifically, based on the selected number of values of performance function F, a new set of individuals (genes) which are expected to provide better values of the performance function F are selected from the presently selected individuals, to thereby carry out alternation of generations of individuals.

Then, at a step S15, a mutation processing is carried out. More specifically, a suitable random number is generated, and the random number is added to the genes, and then the step S12 is again executed to calculate a new value of the performance function F. Thereafter, the above processing is repeatedly carried out. By thus calculating the performance function F by means of a "multipoint reference method" and updating the filter coefficients of the H system-identifying filters and the C system-identifying filters based on the best evaluated performance function F, desired results of identification by the H system-identifying filters and the C system-identifying filters can be obtained.

More specifically, in the identifying processing blocks $25_1$ and $25_2$ in FIG. 2, when the flag FLG is set to "0", the above algorithm initialization is carried out, the performance function F is calculated based on the provisional error signal e, and the steps of selection and crossover (alternation of generations) and mutation are repeated carried out. Then, the filter coefficients of the H system-identifying filters $29_1$ and $29_2$ are updated based on the obtained best evaluated performance function F and the timing pulse signals $Y_1$ and $Y_2$ representative of the engine rotational speed, and the filter coefficients of the C system-identifying filters $31_1$ and $31_2$ are updated based on the best evaluated performance function F and the control signals W1 and W2 from the W filters $26_1$ and $26_2$. Then, the quasi control signals $\eta_1$ and $\eta_2$ are generated from the H system-identifying filters $29_1$ and $29_2$ and input to the adders $33_1$ and $33_2$ which in turn generate the quasi error signals $\epsilon''_1$ and $\epsilon''_2$, which are added together by the adder 22 to be output as the quasi error signal $\epsilon''$. The quasi error signal $\epsilon''$ and the digital error signal $\epsilon'$ from the vibration/noise error sensor 9 input through the A/D converter 15 are input to the adder 23, which in turn outputs the residual signal e as the difference between the quasi error signal $\epsilon''$ and the digital error signal $\epsilon'$ and delivers it to the first and second GA processing blocks $30_1$, $30_2$, $32_1$, $32_2$. The first and second GA processing blocks $30_1$ and $30_2$, $32_1$ and $32_2$ calculate the performance function F so that the residual signal e assumes the minimum value, and based on the calculated performance function F, update the filter coefficients of the H system-identifying filters $29_1$ and $29_2$ and the C system-identifying filters $31_1$ and $31_2$ to thereby identify the H system dynamic characteristic and the C system dynamic characteristic. Then, results of the identification of the C system-identifying filters $31_1$ and $31_2$ are delivered to the C filters $27_1$ and $27_2$ of the vibration/noise control blocks $24_1$ and $24_2$ according to the frequency corresponding to the engine rotational speed, where they are copied, to thereby update the filter coefficients of the C filters $27_1$ and $27_2$. The updated filter coefficients are referred to in the vibration/noise control carried out thereafter. That is, in the vibration/noise control carried out thereafter, the filter coefficients of the W filters $26_1$ and $26_2$ are updated using the identification results of the C system-identifying filters $31_1$ and $31_2$, whereby vibration/noise control can be achieved in a manner responsive to aging change, etc.

Thus, according to the present vibration/noise control system, the H system-identifying filters $29_1$ and $29_2$ simulating the dynamic characteristic of the physical system between the engine 1 and the vibration/noise error sensor 9 and the C system-identifying filters $31_1$ and $31_2$ simulating the dynamic characteristic of the vibration/noise transmission path 13 are modeled and provided within the DSP 12. As a result, an updated transfer characteristic of the vibration/noise transmission path 13 reflecting an aging change etc. can be obtained without the need of generating an identifying sound by the vibration/noise control system itself. In other words, when there is no aging change etc., the digital error signal $\epsilon'$ from the vibration/noise error sensor 9 and the quasi error signal $\epsilon''$ from the adder 22 within the DSP 12 are equal to each other. However, for example, when the self-expanding engine mount 2a hardens due to temperature and/or aging induced changes to its component rubber members, if a fixed transfer characteristic set at checking of the automotive vehicle or the like is held in the C filters $27_1$ and $27_2$, the fixed transfer characteristic cannot be suited for the actual system, resulting in a difference between the quasi error signal $\epsilon''$ and the digital error signal $\epsilon'$. To cope with such a situation, according to the present embodiment, the filter coefficients of the H system-identifying filters $29_1$ and $29_2$ and the C system-identifying filters $31_1$ and $31_2$ are updated so that the residual signal e as the above difference becomes the minimum value to thereby identify the dynamic characteristics of the H system and C system, and results of the identification of the C system-identifying filters $31_1$ and $31_2$ are copied by the C filters $27_1$ and $27_2$, and then the resulting updated filter coefficient values of the C filters $27_1$ and $27_2$ are used in updating the filter coefficients of the W filters $26_1$ and $26_2$, whereby vibration/noise control can be achieved in a manner responsive to aging change etc.

Although in the present embodiment GA is employed in identifying the H system dynamic characteristic and the C system dynamic characteristic, other algorithms such as LMS and neuro algorithims may be employed instead.

Figure 5:
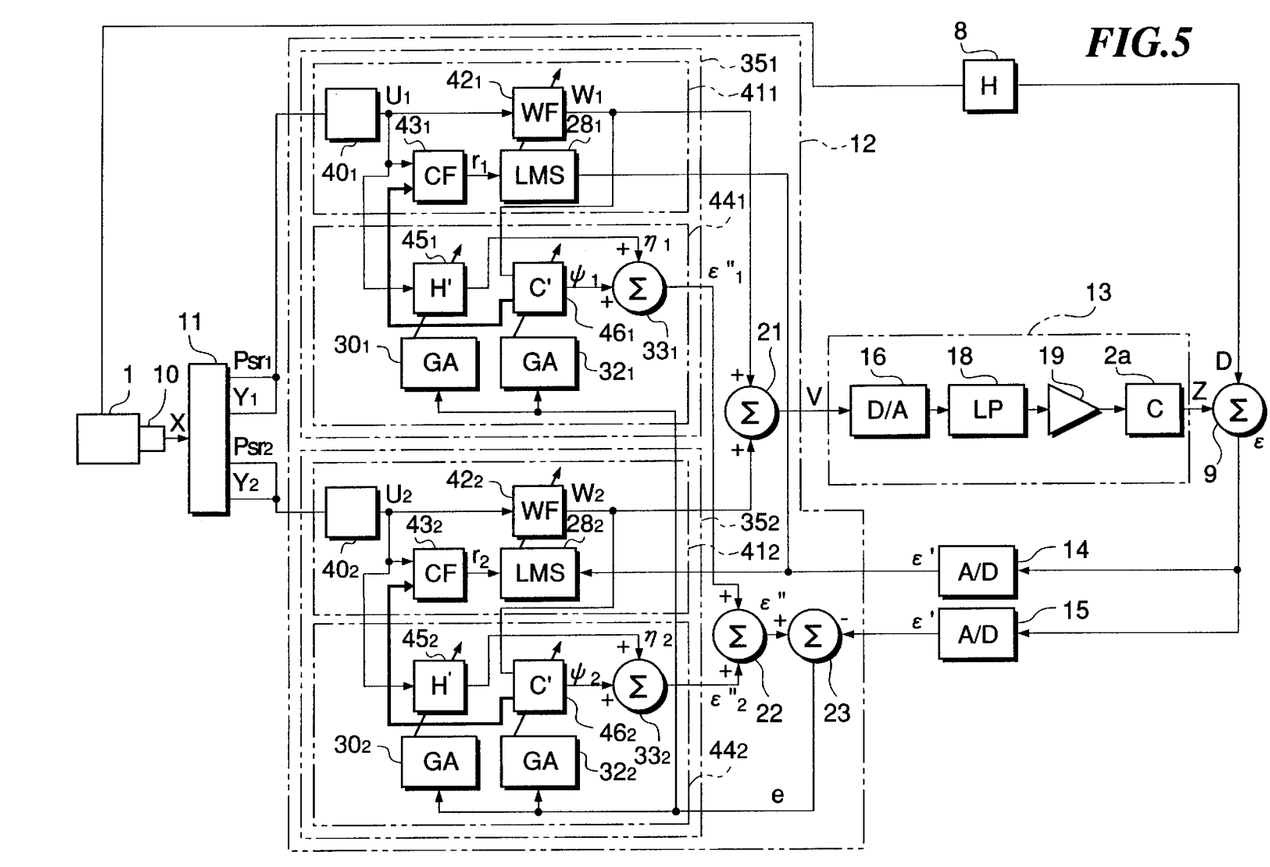
FIG. 5 is a block diagram schematically showing the whole arrangement of a vibration/noise control system according to a second embodiment of the invention.

FIG. 5 shows the whole arrangement of a vibration/noise control system according to a second embodiment of the invention. In the figure, elements corresponding to those in FIG. 2 are designated by identical reference numerals, description of which is omitted. In this second embodiment, the ECU 11 divides the generation time intervals of the timing pulse signals $Y_1$ and $Y_2$ to generate variable sampling pulse signals $Psr_1$ and $Psr_2$ whenever the engine rotates through a predetermined very small rotational angle (e.g. 3.6°). These variable sampling pulse signals $Psr_1$ and $Psr_2$ are supplied to adaptive control circuits $35_1$ and $35_2$ together with the timing pulse signals $Y_1$ and $Y_2$. Vibration/noise control blocks $41_1$ and $41_2$ have reference signal-generating circuits $40_1$ and $40_2$ which generate reference signals $U_1$ and $U_2$ based on the time intervals of generation of the timing pulse signals $Y_1$ and $Y_2$. Further, W filters $42_1$ and $42_2$ are each formed by an FIR-type ADF having two taps. The reference signals $U_1$ and $U_2$ are input to the W filters $42_1$ and $42_2$ and C filters $43_1$ and $43_2$.

In identifying processing blocks $44_1$ and $44_2$, H system-identifying filters $45_1$ and $45_2$ and C system-identifying filters $46_1$ and $46_2$ are each formed by an FIR-type ADF having two taps. The H system-identifying filters $45_1$ and $45_2$ are supplied with the reference signals $U_1$ and $U_2$ from the reference signal-generating circuits $40_1$ and $40_2$, and the C system-identifying filters $46_1$ and $46_2$ are supplied with the control signals $W_1$ and $W_2$ from the W filters $42_1$ and $42_2$.

Next, essential parts of the vibration/noise control system according to the second embodiment will be described with reference to FIG. 6. In the following description, the adaptive control circuit $35_1$ will be mainly described, but a similar description can apply to the adaptive control circuit $35_2$.

Figure 6:
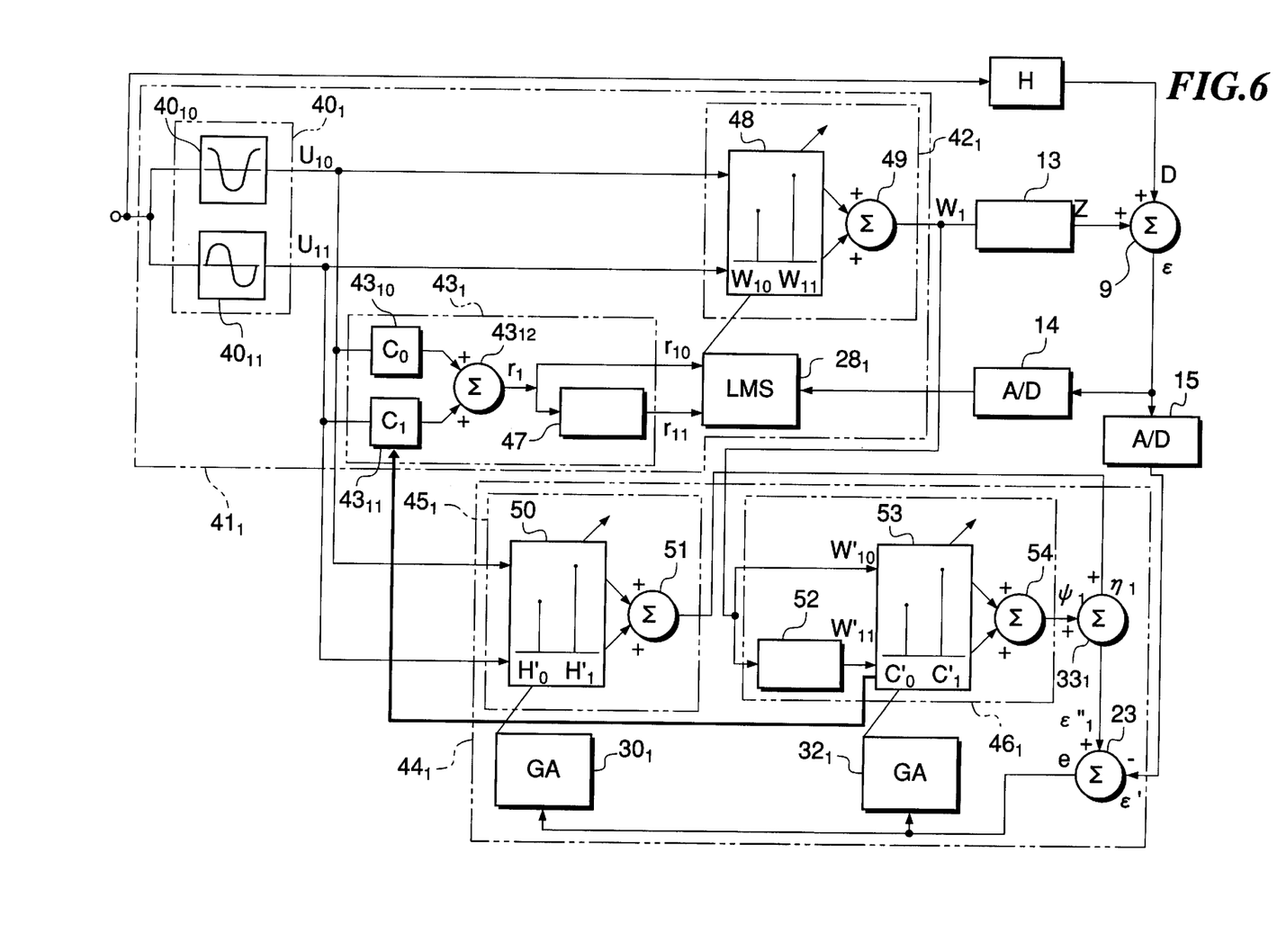
FIG. 6 is a block diagram showing the arrangement of essential parts of the second embodiment.

In FIG. 6, the reference signal-generating circuit $40_1$ is comprised of a sine wave-generating circuit $40_{10}$ for generating a reference sine wave signal $U_{10}$ having a single repetition period dependent on the time intervals of generation of the timing pulse signal $Y_1$, and a delayed sine wave signal-generating circuit $40_{11}$ for generating a delayed sine wave signal $U_{11}$ which is delayed in phase by ¼ of the repetition period of the reference sine wave signal (phase delay of $\pi/2$) relative to the reference sine wave signal $U_{10}$.

The reason why sine wave signals having a phase difference of ¼ of the repetition period are used instead of sine wave signals having the same phase is that the use of sine wave signals having the same phase will greatly degrade the convergency of the control, as is known in the art (e.g. Japanese Laid-Open Patent Publications (Kokai) Nos. 6-274185 and 7-271451, and U.S. Pat. No. 5,638,305). As is disclosed, e.g. in Japanese Laid-Open Patent Publication No. 6-274185, considering the relationships between the delay period T by which the delayed sine wave signal is delayed and equi-amplitude ellipse and equi-phase straight line, the locus of the equi-amplitude ellipse forms a perfect circle when the delay period T is equal to ¼, and when there is a delay $\psi$ in phase, the equi-phase straight line extends evenly in the quadrants I to IV of a coordinate plane, resulting in the optimal adaptive control. Further, the delay period T should be set to a value within a range of $\frac{1}{3} \geq T \geq \frac{1}{7}$ (T is a real number) which is an allowable range for securing good convergency.

In FIG. 6, it is seen that the sine wave signal-generating circuit $40_{10}$ generates a cosine wave signal, and the delayed sine wave signal-generating circuit $40_{11}$ generates a sine wave signal. This is because in actuality a sine wave is delayed relative to a cosine wave by a delay period of $\pi/2$. The illustration in FIG. 6 is for the sake of explanation. That is, in order to clearly show that the output signal from the delayed sine wave signal-generating circuit $40_{11}$ is delayed in phase by $\pi/2$ relative to the output signal from the sine wave signal-generating circuit $40_{10}$, it is illustrated in FIG. 6 that the sine wave signal-generating circuit $40_{10}$ generates the cosine wave signal, and the delayed sine wave signal-generating circuit 4011 generates the sine wave signal.

In FIG. 6, the C filter $43_1$ is comprised of a sine wave-correcting table $43_{10}$ which previously stores information indicative of the phase of the vibration/noise transmission path 13 relative to the sine wave signal $U_{10}$ from the sine wave signal-generating circuit $40_{10}$ as first phase information $C_0$ and updates the first phase information $C_0$ based on results of identification by the C system-identifying filter $46_1$, a delayed sine wave-correcting table $43_{11}$ which stores information indicative of the phase of the vibration/noise transmission path 13 relative to the delayed sine wave signal $U_{11}$ from the delayed sine wave signal-generating circuit $40_{11}$ as second phase information C1 and updates the second phase information $C_1$ based on results of the identification by the C system-identifying filter $46_1$, an adder $43_{12}$ which adds together outputs from the sine wave-correcting table $43_{10}$ and the delayed sine wave-correcting table $43_{11}$ to generate a reference signal $\gamma_1$, and a delay circuit 47 which delays a second reference signal $\gamma_{11}$ of the reference signal $\gamma_1$ corresponding to the delayed sine wave signal $U_{11}$, by $\pi/2$, i.e. ¼ of the repetition period of the sine wave signal $U_{10}$ relative to a reference signal of the reference signal $Y_1$ corresponding to the sine wave signal $U_{10}$.

The W filter $42_1$ is comprised of a coefficient-updating block 48 which updates first and second filter coefficients $W_{10}$ and $W_{11}$ of the W filter by predetermined convolution, and an adder 49 which adds together the filter coefficients $W_{10}$ and $W_{11}$ updated by the filter-updating block 48 and delivers the resulting control signal $W_1$ to the vibration/noise transmission path 13 and the C system-identifying filter $46_1$.

The H system-identifying filter $45_1$ is comprised of a coefficient-updating block 50 which updates first and second H system-identifying filter coefficients H'$_0$ and H'$_1$ by predetermined convolution, and an adder 51 which adds together the filter coefficients H'$_0$ and H'$_1$ updated by the coefficient-updating block 50 and delivers the resulting quasi control signal $\eta_1$.

The C system-identifying filter $46_1$ is comprised of a delay block 52 which delays a second control signal W'$_{11}$ of the control signal $W_1$ from the W filter $42_1$ corresponding to the delayed sine wave signal $U_{11}$ relative to a first control signal W'$_{10}$ of the same corresponding to the sine wave signal $U_{10}$ by $\pi_2$, a coefficient-updating block 53 which updates first and second C system-identifying filter coefficients C'$_0$ and C'$_1$ by predetermined convolution, and an adder 54 which adds together the first and second filter coefficients C'$_0$ and C'$_1$ updated by the coefficient-updating block 53 and delivers the resulting quasi signal $\psi_1$.

With the above arrangement, when the timing pulse signal $Y_1$ is input so that the flag FLG is set to "1", the sine wave signal $U_{10}$ and the delayed sine wave signal $U_{11}$ from the sine wave signal-generating circuit $40_{10}$ and the delayed sine wave signal-generating circuit $40_{11}$ are delivered as reference signals to the W filter $42_1$ and the C filter $43_1$. At the C filter $43_1$, the first phase information $C_0$ is read from the sine wave-correcting table $43_{10}$, and the second phase information $C_1$ from the delayed sine wave-correcting table $43_{11}$, and the output signals from these tables are added together by the adder $43_{12}$ to be generated as the reference signal $\gamma_1$. Of the reference signal $\gamma_1$, the first reference signal $\gamma_{10}$ is directly input to the LMS processing block $28_1$, while the second reference signal $\gamma_{11}$ which is delayed in phase by $\pi_2$ relative to the first reference signal $\gamma_{10}$ is input via the delay block $47$ to the LMS processing block $28_1$. As mentioned above, at the C filter $43_1$, the first and second reference signals $\gamma_{10}$ and $\gamma_{11}$ are generated in response to the sine wave signal $U_{10}$ and the delayed sine wave signal $U_{11}$, respectively, and input to the LMS processing block $28_1$.

At the LMS processing block $28_1$, the first and second filter coefficients $W_{10}$ and $W_{11}$ of the W filter $20_1$ are updated by the use of the following equations (2) and (3):

$$W_{10}(i+1)=W_{10}(i)+\mu\times\gamma_{10}\times\epsilon' \qquad (2)$$

$$W_{10}(i+1)=W_{11}(i)+\mu\times\gamma_{11}\times\epsilon' \qquad (3)$$

where $W_{10}(i+1)$ and $W_{11}(i+1)$ represent the updated values of the filter coefficients, and $W_{10}(i)$ and $W_{11}(i)$ values of the same just before the updating. $\mu$ represents a step-size parameter for defining an amount of correction for updating the coefficients, which is set to a predetermined value dependent on the object to be controlled, to achieve the optimal control.

Then, at the coefficient-updating block $48$ of the W filter $42_1$, updating of the filter coefficients of the W filter is carried out, and at the adder $49$, convolutions (product-sum operations) of the updated first filter coefficient $W_{10}(i+1)$ and the sine wave signal $U_{10}$, and the updated second filter coefficient $W_{11}(i+1)$ and the delayed sine wave signal $U_{11}$ are carried out, and the resulting control signal $W_1$ is generated.

The control signal $W_1$ is then delivered through the vibration/noise transmission path $13$ to be converted to the driving signal Z, which is input to the vibration/noise sensor $9$. On the other hand, the vibration/noise signal D from the engine as the vibration/noise source is input to the vibration/noise sensor $9$, where it is canceled with the driving signal Z, and the resulting analog error signal $\epsilon$ is generated from the vibration/noise error sensor $9$. The analog error signal $\epsilon$ is sampled by the A/D converter $14$ into the digital error signal $\epsilon'$ according to the variable sampling pulse signal as a trigger signal, and the digital error signal $\epsilon'$ is input to the LMS processing block $28_1$ for again updating the filter coefficients of the W filter $42_1$.

On the other hand, in the identifying processing blocks $44_1$ and $44_2$, when the flag FLG is set to "1", initialization of the algorithm is carried out similarly to the aforedescribed first embodiment. Then, the performance function F is calculated based on the provisional residual signal e, and then the steps of selection, crossover (alternation of generations) and mutation are repeatedly executed. The first and second filter coefficients $H'_0$ and $H'_1$ for the H system identification are updated based on the best evaluated performance function F obtained by the first GA processing block $30_1$ and the sine wave signal $U_{10}$ or the delayed sine wave signal $U_{11}$, and the updated filter coefficients $H'_0$ and $H'_1$ are input through the adder $51$ to the adder $33_1$ as the quasi control signal $\eta_1$. On the other hand, at the C system-identifying filter $53$, the control signal of the control signal $W_1$ output from the W filter $42_1$ corresponding to the sine wave signal $U_{10}$ is input to the coefficient-updating block $53$ as the first identifying control signal $W'_{10}$, while the control signal corresponding to the delayed sine wave signal $U_{11}$ is delivered through the delay block $52$ to the coefficient-updating block $53$ as the second identifying control signal $W'_{11}$ having a phase delay of ¼ of the repetition period. The filter coefficients of the C system-identifying filters $46_1$ and $46_2$ are updated based on the first and second identifying control signals $W'_{10}$ and $W'_{11}$ and the best performance function F obtained by the first GA processing block $32_1$, and added together by the adder $54$, and the resulting quasi reference signal $\psi_1$ is input to the adder $33_1$. At the adder $33_1$, the quasi reference signal $\psi_1$ and the quasi control signal $\eta_1$ are added together into the quasi error signal $\epsilon''_1$. At the adder $23$, the difference between the quasi error signal $\epsilon''_1$ and the digital error signal $\epsilon_1$ from the vibration/noise error sensor $9$ is calculated, and the calculated difference is supplied as the residual signal e to the first and second GA processing blocks $30_1$ and $32_1$, where the performance function F is again calculated such that the residual signal e assumes the minimum value, followed by repeated execution of the above processing. When the filter coefficients of the H system-identifying filter $45_1$ and the C system-identifying filter $46_1$ become converged so that the identifying operations are terminated, the filter coefficient of the C system-identifying filter $46_1$ is copied together with the engine rotational speed currently detected into the sine wave-correcting table $43_{10}$ and delayed sine wave-correcting table $43_{11}$ of the C filter $43_1$. That is, portions of the first and second phase information $C_0$ and $C_1$ corresponding to the frequency corresponding to the current engine rotational speed are updated, so that in the vibration/noise control subsequently carried out, the first and second phase information $C_0$ and $C_1$ are referred to to update the filter coefficients $W_{10}$ and $W_{11}$ of the W filter $42_1$. Similar processing is also carried out in the identifying processing block $44_2$.

As described above, according to the second embodiment as well, vibration/noise control is carried out in a manner responsive to aging change etc. Besides, according to the second embodiment, the H system-identifying filters $45_1$ and $45_2$ and the C system-identifying filters $46_1$ and $46_2$ all have two taps, and therefore, by using GA of multipoint reference type, high-speed arithmetic operations which were not available with the prior art can be realized.

To update the H system dynamic characteristic and the C system dynamic characteristic, it is desirable to take into account optimal updating weights in addition to updated values and known values if the filter coefficients of the C filters $43_1$ and $43_2$ are previously stored in coefficient-frequency tables. In such a case, the updating weights should desirably be utilized so that the characteristics may be smoothly expressed not only at the frequency applied to the updating carried out at the present time but also at higher and lower frequencies adjacent to the frequency. Further, in view of the fact that changes in the properties of the rubber members forming the engine mount due to aging and temperature occur slowly in ordinary use, the updating weights may be set small so as for the stored transmission characteristics not to show abrupt changes, insofar as desired results are obtained.

If the filter coefficients of the C filters $43_1$ and $43_2$ are described in FIR type ADFs, desirably C filter coefficient-to-frequency region conversion tables may be provided, and the filter coefficients of the C filters may be subjected to inverted-Fourier transform into tap coefficients to replace the filter coefficients by the tap coefficients, to thereby update the coefficients of the frequency region conversion tables. In this alternative, however, the calculation burden is large due to the inverted-Fourier transform. Therefore, the identification results may be preserved by the first and second GA processing blocks $30_1$ and $30_2$ until the filter coefficients of the C filters are calculated for the frequencies within the entire control frequency range. After the calculation of the filter coefficients is completed, the filter coefficients thus obtained are subjected to inverted-Fourier transform to replace the filter coefficients by the resulting tap coefficients. Thus, the transfer characteristic can be identified in an efficient manner.

Further, a transfer characteristic identified at checking of the automotive vehicle or the like, i.e. an initial transfer characteristic may be preserved, and in the event of a malfunctioning of the engine 1, or the engine 1 is restored into an initial state at checking of the automotive vehicle or the like, the preserved initial transfer characteristic may be used, to thereby secure controllability.

The present invention is not limited to the above described embodiments.

Although in the second embodiment described above, the first and second reference signals $\gamma_{10}$ and $\gamma_{11}$ by means of the adder $43_{12}$ and the delay block 47, alternatively the first and second reference signals $\gamma_{10}$ and $\gamma_{11}$ may be directly formed based on the first phase information $C_0$ and the second phase information $C_1$ as well as the input sine wave signal $U_{10}$ and the delayed wave signal U11, without providing the above components. More specifically, generally the first and second reference signals $\gamma_{10}$ and $\gamma_{11}$ are expressed in a discrete form by the following equations (4) and (5), provided that the phase is designated by $\phi$:

$$\gamma_{10}(n) = C_0 A\cos(\omega n + \phi) + C_1 A\sin(\omega n + \phi) \quad (4)$$

$$\gamma_{11}(n) = C_0 A\sin(\omega n + \phi) - C_1 A\cos(\omega n + \phi) \quad (5)$$

Therefore, by using these equations (4) and (5), the first and second reference signals $\gamma_{10}$ and $\gamma_{11}$ may be directly formed.

Further, although in the above described embodiments, two vibration orders, i.e. the primary vibration component and the secondary vibration component are controlled in adaptive manner as objects to be controlled, it goes without saying that three or more vibration orders may be controlled, thereby achieving adaptive control with good convergency in a manner accurately responsive to aging change etc.

What is claimed is:

1. A vibration/noise control system for controlling vibrations and noises generated with a periodicity or a quasi-periodicity from a vibration/noise source having at least a rotating member, said system comprising:

timing pulse signal-detecting means for detecting at least one timing pulse signal indicative of a period of vibrations and noises peculiar to at least one component part of said vibration/noise source;

first filter means for generating a control signal for controlling said vibrations and noises from said vibration/noise source, said first filter means comprising an adaptive digital filter and having an adjustable filter coefficient;

electromechanical transducer means, arranged in at least one vibration/noise transmission path through which said vibrations and noises from said vibration/noise source are transmitted, for converting said control signal into a driving signal for driving said vibration/noise source;

error signal-detecting means for detecting an error signal indicative of a difference between said driving signal and a vibration/noise signal indicative of said vibrations and noises from said vibration/noise source;

second filter means for storing a transfer characteristic of a portion of said at least one vibration/noise transmission path extending between said first filter means and said error signal-detecting means, and for generating a reference signal based on said transfer characteristic and said at least one timing pulse signal, said second filter means also having an adjustable filter coefficient;

control signal-updating means for updating said filter coefficient of said first filter means so that said first filter means generates said control signal in a manner such that said error signal is minimized, based on said error signal, said reference signal and said filter coefficient of said first filter means;

first dynamic characteristic-identifying means for simulating a dynamic characteristic of a physical system extending between said first filter means and a predetermined control area;

second dynamic characteristic-identifying means for simulating a dynamic characteristic of said portion of said at least one vibration/noise transmission path extending between said first filter means and said error signal-detecting means; and reference signal-updating means for updating said filter coefficient of said second filter means based on a simulation result of said second dynamic characteristic-identifying means;

wherein each of said first and second dynamic characteristic-identifying means includes an adaptive digital filter having a filter coefficient, and filter coefficient-updating means for updating said filter coefficient of said adaptive digital filter of each of said first and second dynamic characteristic-identifying means.

2. A vibration/noise control system as claimed in claim 1, wherein said filter coefficient-updating means of each of said first and second dynamic characteristic-identifying means updates said filter coefficient of said adaptive digital filter of each of said first and second dynamic characteristic-identifying means in accordance with one of a genetic algorithm, an LMS algorithm and a neuro algorithm.

3. A vibration/noise control system as claimed in claim 2, wherein said filter coefficient-updating means of each of said first and second dynamic characteristic-identifying means: (i) calculates values of a performance function based on a residual signal representing a difference between said error signal and a quasi error signal from said first and second dynamic characteristic-identifying means in accordance with said genetic algorithm, and (ii) updates said filter coefficient of said adaptive digital filter of each of said first and second dynamic characteristic-identifying means according to an optimum one of the calculated values of said performance function.

4. A vibration/noise control system as claimed in claim 3, wherein said filter coefficient-updating means of said first dynamic characteristic-identifying means updates said filter coefficient of said adaptive digital filter of said first dynamic characteristic-identifying means based on said optimum one of the calculated values of said performance function and said at least one timing pulse signal from said timing pulse signal-detecting means, and wherein said filter coefficient-updating means of said second dynamic characteristic-identifying means updates said filter coefficient of said adaptive digital filter of said second dynamic characteristic-identifying means based on said optimum one of the calculated values of said performance function and said control signal from said first filter means.

19

5. A vibration/noise control system as claimed in claim 3, wherein said filter coefficient-updating means of each of said first and second dynamic characteristic-identifying means calculates said performance function in a manner such that a value of said residual signal is minimized.

6. A vibration/noise control system as claimed in claim 1, further comprising:

rotational speed-detecting means for detecting a rotational speed of said rotating member based on a detection result of said timing pulse signal-detecting means;

first dynamic characteristic-storing means for storing said simulated dynamic characteristic of said physical system extending between said first filter means and said predetermined control area as a function of the rotational speed of said rotating member;

second dynamic characteristic-storing means for storing said simulated dynamic characteristic of said portion of said at least one vibration/noise transmission path extending between said first filter means and said error signal-detecting means as a function of the rotational speed of said rotating member; and dynamic characteristic-updating means for updating said simulated dynamic characteristics stored in said first and second dynamic characteristic-storing means based on updated simulation results of said first and second dynamic characteristic-identifying means.

7. A vibration/noise control system for controlling vibrations and noises generated with a periodicity or a quasi-periodicity from a vibration/noise source having at least a rotating member, said system comprising:

timing pulse signal-detecting means for detecting at least one timing pulse signal indicative of a period of vibrations and noises peculiar to at least one component part of said vibration/noise source;

sine wave-generating means for generating a reference sine wave having a single repetition period dependent upon time intervals of generation of said at least one timing pulse signal;

delayed sine wave-generating means for generating a delayed sine wave which is delayed by a delay period T of $\frac{1}{3} \geq T \geq \frac{1}{7}$ relative to said reference sine wave, wherein T is a real number;

first filter means for generating a control signal for controlling said vibrations and noises from said vibration/noise source, said first filter means comprising an adaptive digital filter including two taps, and said first filter means having an adjustable filter coefficient;

electromechanical transducer means, arranged in at least one vibration/noise transmission path through which said vibrations and noises from said vibration/noise source are transmitted, for converting said control signal into a driving signal for driving said vibration/ noise source;

error signal-detecting means for detecting an error signal indicative of a difference between said driving signal and a vibration/noise signal indicative of said vibrations and noises from said vibration/noise source;

second filter means for storing a transfer characteristic of a portion of said at least one vibration/noise transmission path extending between said first filter means and said error signal-detecting means, and for generating a reference signal based on said transfer characteristic and said at least one timing pulse signal, said second filter means also having an adjustable filter coefficient;

control signal-updating means for updating said filter coefficient of said first filter means so that said first filter means generates said control signal in a manner such that said error signal is minimized, based on said error signal, said reference signal and said filter coefficient of said first filter means;

first dynamic characteristic-identifying means for simulating a dynamic characteristic of a physical system extending between said first filter means and a predetermined control area;

second dynamic characteristic-identifying means for simulating a dynamic characteristic of said portion of said at least one vibration/noise transmission path extending between said first filter means and said error signal-detecting means; and reference signal-updating means for updating said filter coefficient of said second filter means based on a simulation result of said second dynamic characteristic-identifying means;

wherein each of said first and second dynamic characteristic-identifying means includes an adaptive digital filter having a filter coefficient, and filter coefficient-updating means for updating said filter coefficient of said adaptive digital filter of each of said first and second dynamic characteristic-identifying means; and wherein said adaptive digital filter of each of said first and second dynamic characteristic means includes two taps.

8. A vibration/noise control system as claimed in claim 7, wherein said delay period T is set to ¼ of a repetition period of said reference sine wave.

9. A vibration/noise control system as claimed in claim 7, wherein said filter coefficient-updating means of each of said first and second dynamic characteristic-identifying means updates said filter coefficient of said adaptive digital filter of each of said first and second dynamic characteristic-identifying means in accordance with one of a genetic algorithm, an LMS algorithm and a neuro algorithm.

10. A vibration/noise control system as claimed in claim 9, wherein said filter coefficient-updating means of each of said first and second dynamic characteristic-identifying means: (i) calculates values of a performance function based on a residual signal representing a difference between said error signal and a quasi error signal from said first and second dynamic characteristic-identifying means in accordance with said genetic algorithm, and (ii) updates said filter coefficient of said adaptive digital filter of each of said first and second dynamic characteristic-identifying means according to an optimum one of the calculated values of said performance function.

11. A vibration/noise control system as claimed in claim 10, wherein said first filter means generates a first control signal corresponding to said reference sine wave and a second control signal corresponding to said delayed sine wave, wherein said filter coefficient-updating means of said first dynamic characteristic-identifying means updates said filter coefficient of said adaptive digital filter of said first dynamic characteristic-identifying means based on said optimum one of the calculated values of said performance function and one of said reference sine wave and said delayed sine wave, and wherein said filter coefficient-updating means of said second dynamic characteristic-identifying means updates said filter coefficient of said adaptive digital filter of said second dynamic characteristic-identifying means based on said optimum one of the calculated values of said performance function and said first and second control signals.

12. A vibration/noise control system as claimed in claim 10, wherein said filter coefficient-updating means of each of said first and second dynamic characteristic-identifying means calculates said performance function in a manner such that a value of said residual signal is minimized.

13. A vibration/noise control system as claimed in claim 7, further comprising:

rotational speed-detecting means for detecting a rotational speed of said rotating member based on a detection result of said timing pulse signal-detecting means;

first dynamic characteristic-storing means for storing said simulated dynamic characteristic of said physical system extending between said first filter means and said predetermined control area as a function of the rotational speed of said rotating members;

second dynamic characteristic-storing means for storing said simulated dynamic characteristic of said portion of said at least one vibration/noise transmission path extending between said first filter means and said error signal-detecting means as a function of the rotational speed of said rotating member; and dynamic characteristic-updating means for updating said simulated dynamic characteristics stored in said first and second dynamic characteristic-storing means based on updated simulation results of said first and second dynamic characteristic-identifying means.

* * * * *